(12) United States Patent
Livne

(10) Patent No.: US 7,800,778 B2
(45) Date of Patent: Sep. 21, 2010

(54) LED PRINT HEAD PRINTING

(75) Inventor: Haim Livne, Kfar-Saba (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 1369 days.

(21) Appl. No.: 10/507,427

(22) PCT Filed: Mar. 12, 2002

(86) PCT No.: PCT/IL02/00277

§ 371 (c)(1),
(2), (4) Date: Sep. 10, 2004

(87) PCT Pub. No.: WO03/076195

PCT Pub. Date: Sep. 18, 2003

(65) Prior Publication Data

US 2005/0117014 A1 Jun. 2, 2005

(51) Int. Cl.
*G06K 15/10* (2006.01)

(52) U.S. Cl. ........... 358/1.8; 358/463; 358/501; 358/503; 358/1.1; 358/3.26; 347/115; 347/117; 347/118; 347/238; 347/251

(58) Field of Classification Search ........... 358/505, 358/509–510, 474–475; 355/37, 70; 347/238
See application file for complete search history.

(56) References Cited

U.S. PATENT DOCUMENTS

| | | | |
|---|---|---|---|
| 5,016,040 A * | 5/1991 | Dwyer, III ........... 355/20 |
| 5,061,049 A | 10/1991 | Hornbeck | |
| 5,105,299 A | 4/1992 | Anderson et al. | |
| 5,586,055 A * | 12/1996 | Ng et al. ........... 702/90 |
| 5,630,027 A | 5/1997 | Venkateswar et al. | |
| 5,757,411 A | 5/1998 | Florence | |
| 5,764,183 A * | 6/1998 | Vergona ........... 347/232 |
| 5,825,400 A * | 10/1998 | Florence ........... 347/239 |
| 5,936,657 A * | 8/1999 | Fork ........... 347/237 |
| 6,072,517 A | 6/2000 | Fork et al. | |
| 6,297,875 B1 | 10/2001 | Nishikawa | |
| 7,066,570 B1 * | 6/2006 | van Doorn et al. ........... 347/40 |
| 7,239,337 B2 * | 7/2007 | Ogihara et al. ........... 347/238 |
| 2002/0118270 A1 * | 8/2002 | Gaudiana et al. ........... 347/238 |

(Continued)

FOREIGN PATENT DOCUMENTS

EP 0 933 925 8/1999

(Continued)

OTHER PUBLICATIONS

Translated Japanese Office Action for Japanese Patent Application No. 2003-574441, mailed Feb. 22, 2008 (2 pages).

(Continued)

*Primary Examiner*—Benny Q Tieu
*Assistant Examiner*—Javier J Ramos

(57) ABSTRACT

A method of pixelized image formation on a photosensitive surface, comprising: providing relative motion of the photosensitive surface relative to a multiplicity of light sources, such that pixels on the surface pass a plurality of said light sources; and exposing a plurality of the pixels of the surface to one or more, but fewer than the plurality, of said light sources, such that the exposure of the exposed pixels is the same.

29 Claims, 3 Drawing Sheets

U.S. PATENT DOCUMENTS

2003/0116694 A1* 6/2003 Maeda .................. 250/205

FOREIGN PATENT DOCUMENTS

| | | |
|---|---|---|
| JP | 59098879 | 6/1984 |
| JP | 59194855 | 11/1984 |
| JP | 61109744 | 5/1986 |
| JP | 02122953 | 5/1990 |
| JP | 06255175 | 9/1994 |
| JP | 09138472 | 5/1997 |
| JP | 11240203 | 9/1999 |
| JP | 2000089640 | 3/2000 |
| JP | 2001125244 | 5/2001 |
| JP | 2002069868 | 3/2002 |

OTHER PUBLICATIONS

Japanese Office Action for Japanese Patent Application No. 2003-574441, mailed Feb. 22, 2008 (2 pages).

* cited by examiner

LED PRINT HEAD PRINTING

RELATED APPLICATIONS

The present application is a U.S. national application of PCT Application No. PCT/IL02/00277, filed on Mar. 12, 2002.

FIELD OF THE INVENTION

The invention relates to the field of non impact printing devices, for example, to light emitting diode (LED) printing devices.

BACKGROUND OF THE INVENTION

Non impact printing devices such as devices based on thermal mechanisms, inkjet mechanisms, and laser mechanisms, are commonly used instead of impact based printing devices. A known type of non impact printer comprises an array of minute light emitting diodes (LED's) forming a print head, for example with a row of chips. Each chip typically comprises approximately 118 to 472 elements per centimeter which is equivalent to 300 to 1200 elements per inch. The array of LED's is positioned in the printer to face a photoreceptive surface. The photoreceptive surface is charged by the printer and placed in motion relative to the LED array. The LED's are selectively enabled by an electronic circuit in the printer, responsive to data supplied to or generated by the printer. Areas exposed to light from the LEDs are discharged, producing a latent dot image of uncharged areas on the photoreceptive surface. A charged toner or ink is brought in contact with the photoreceptive surface to develop the latent image. The developed image is transferred to a hardcopy material such as paper.

LED based print heads have been used to form latent images in electrophotography.

In general, the LEDs on a chip are not exactly identical or positioned exactly, resulting in minor variations in the uniformity of the optical spot size and deviation in their position. Even microscopic differences may result in noticeable distortions in a printout, when they are repeated along a column.

As used in this document and in the claims, the term "width" is defined as the extent of a photo-surface to be exposed in a direction perpendicular to a direction of relative motion between light sources and the photo-surface. A "row" is defined as a single line of pixels or light sources that runs substantially the entire width of the photo-surface to be exposed. A line that does not run the entire width is termed a "partial row". A column is defined as a plurality of pixels or light sources having a dimension perpendicular to a row. When a group of two or more partial rows of light sources are used to effectively form a single row of light sources, the group as a whole is referred to herein as a row.

U.S. Pat. No. 5,630,027, the disclosure of which is incorporated by reference, describes a system for splicing two partial rows of LEDs that are used to expose a photoreceptor. In this patent linear arrays of LEDs that are shorter than the width of the photoreceptor are used. Light from the arrays is focused onto the photoreceptor such that a portion of the extent of the arrays overlap. One LED from one of the arrays is used to expose each pixel along the line. However, from each row of pixels a different breakpoint between the arrays of LEDs is used, to break up any pattern that would be formed if a constant breakpoint were used This patent also describes U.S. Pat. No. 5,061,049 in which multiple partial rows of LEDs are projected onto the photoreceptor surface. As indicated in U.S. Pat. No. 5,061,049, the disclosure of which is incorporated by reference, both partial rows of LEDs can be used to expose any pixel, by providing a suitable delay between the partial rows, such that the amount of light provided to the surface is increased. U.S. Pat. No. 5,630,027 shows four partial rows. U.S. Pat. No. 5,061,049 appears to describe only two.

U.S. Pat. No. 5,757,411 also shows overlapping linear partial row arrays. However, in this patent reduced intensity of the overlapping elements is apparently used.

EP Patent publication EP 0 933 925 A2 describes a system for exposing a photographic material to multiple levels of brightness, in which multiple rows of light sources are used to expose each pixel. Each pixel is selectively exposed by a light source as the photo-material passes the particular light source. The number of sources activated for a given pixel determines the total exposure.

LED based printing devices may be limited in speed by the speed of a bus that supplies the data to the head and/or the electronic circuitry associated with the head. Furthermore, there is no backup for a LED. If a single LED fails the whole print head needs to be replaced. Another possible limitation on printing speed may be a limitation on the amount of light energy that can be supplied by the LED during a period in which it can expose a given pixel.

SUMMARY OF THE INVENTION

An aspect of some embodiments of the invention relates to using a plurality of rows of light sources, such as LEDs or other small light sources to expose a photo-receptor in a binary manner (one total exposure level for the exposed areas), such that fewer than all the light sources in column of light sources is used to expose a pixel associated with that column. In the following description, the term LED is used for any light source suitable for carrying out the invention.

In some embodiments of the invention one or more of the light sources are chosen randomly or quasi-randomly from the sources in the column. Alternatively, the source or sources are chosen in accordance with a predetermined rota In some embodiments of the invention, a single light source is chosen from the sources available. In other embodiments a plurality of the sources are chosen. Thus, in some embodiments of the invention, a row of pixels is created by illuminating a same pixel on the photosensitive surface with more than one LED.

Use of different light sources (or pluralities of light sources) for exposing pixels in a column results in breaking-up visual patterns that may result from variations in characteristics (e.g., one or more of spot size, energy, position) of the sources in a single row. Use of multiple sources results in averaging out of the characteristics of the sources used Generally, this results in a reduction of artifacts caused by variations of such characteristics.

Thus, in an embodiment of the invention, the photosensitive surface is exposed by a plurality of LED print heads (LPIH) arranged in the form of a matrix of LEDs or an LPH with a matrix of multiple rows and columns of LEDs, in order to create an image in the photosensitive surface.

Alternatively or additionally, the LED or LEDs chosen may be influenced by known defects in the printheads.

There is thus provided, in accordance with an embodiment of the invention, apparatus for exposing, in a binary manner, a photoreceptive surface having a width and having relative movement with an irradiator in a direction perpendicular to the width, comprising:

an irradiator comprising a plurality of rows of substantially identical light sources, each said row of light sources having an axis generally directed along said width, said rows being spaced in a direction generally perpendicular to said width to form a generally rectangular array of light sources; and a controller that controls activation of the light sources to selectively irradiate portions of said photoreceptive surface to form a latent image thereon during said relative motion, using fewer than all of the light sources available for illuminating the pixel, such that each of said portion that is irradiated is exposed to a same amount of light.

There is further provided, in accordance with an embodiment of the invention, apparatus for exposing, in a binary manner a photoreceptive surface having a width and having relative movement with an irradiator in a direction perpendicular to the width, comprising:

an irradiator comprising a plurality of rows of substantially identical light sources, each said row of light sources having an axis generally directed along said width, said rows being spaced in a direction generally perpendicular to said width to form a generally rectangular array of light sources; and a controller that controls activation of the light sources to selectively irradiate portions of said photoreceptive surface to form a latent image thereon during said relative motion, using fewer than all of the light sources available for illuminating the pixel, such that each of said portion that is irradiated is exposed to a same amount of light, wherein, when one or more of the rows of light sources is formed of a plurality of partially overlapping partial rows of light sources, light sources outside the overlap are controlled by said controller as aforesaid.

In an embodiment of the invention, the light sources comprise light emitting diodes.

In an embodiment of the invention, each row of said plurality of rows of light sources are on a different print head. Alternatively, more than one of said plurality of rows of light sources are on a single print head. Alternatively, all of said plurality of rows of light sources are on a single print head. Optionally, at least two of said plurality of rows are formed on a monolithic substrate.

In an embodiment of the invention, the plurality of rows comprises fewer than four rows. Alternatively, the plurality of rows comprises between five and nine rows. Alternatively, the plurality of rows comprises ten of more rows.

In an embodiment of the invention, the controller is operative to expose pixels along a column of pixels utilizing a light source situated in said column chosen in a random or quasi-random manner. Alternatively, said different rows of light sources are chosen in accordance with a fixed repeat Optionally, all of the pixels in a row on said photoreceptor are exposed utilizing a same row of light sources. Alternatively, at least some pixels in a row are exposed utilizing light sources from different rows of light sources.

In an embodiment of the invention, the controller is operative to expose pixels along a column of pixels utilizing a plurality of light sources situated in said column.

Optionally, the apparatus includes a motor that provides motion of said photoreceptor. Optionally, the apparatus includes a position sensor that provides an indication of position of said photoreceptor with respect to said rows of light sources. Optionally, the controller activates said light sources, responsive to said indication of position.

In an embodiment of the invention, the photoreceptive surface is a charged photoconductive surface and wherein exposure to light of the light sources selectively discharges the surface.

There is further provided, in accordance with an embodiment of the invention, printing apparatus comprising:

exposure apparatus according to the invention in which the photoreceptive surface is a charged photoconductive surface; and a developer that develops the latent image with a colored toner to form a developed image thereon;

said printing apparatus including a transfer station at which said developed image is transferred to a final substrate.

Optionally, the colored toner is a powdered toner or a liquid toner.

In an embodiment of the invention, the photoreceptor is a photosurface and wherein exposure from said light sources forms a latent image in said photosurface that can be chemically developed to form a visible image.

There is further provided, in accordance with an embodiment of the invention, printing apparatus comprising:

exposure apparatus according to the invention in which the photoreceptive surface is a photosurface that can be chemically developed to form a visible image; and a developer that chemically develops the latent image to form a visible image.

There is further provided, in accordance with an embodiment of the invention, photo-printing apparatus, comprising:

a plurality of latent image forming devices for a photosurface according to the invention; each said device emitting light of a different color; and a developer that chemically develops the latent image to form a visible image.

Optionally, the colors include red, green and blue.

There is further provided, in accordance with an embodiment of the invention, a method of pixelized image formation on a photosensitive surface, comprising:

providing relative motion of the photosensitive surface relative to a multiplicity of light sources, such that pixels on the surface pass a plurality of said light sources; and exposing a plurality of the pixels of the surface to one or more, but fewer than the plurality, of said light sources, such that the exposure of the exposed pixels is the same.

There is further provided, in accordance with an embodiment of the invention, a method of pixelized image formation on-a photosensitive surface, comprising:

providing relative motion of the photosensitive surface relative to a multiplicity of light sources, such that pixels on the surface pass a plurality of said light sources, wherein said multiplicity of light sources are formed in rows, each said row being formed of a single light source for each position along the row or formed by a plurality of partially overlapping rows of light sources; and exposing a plurality of the pixels of the surface to one or more, but fewer than the plurality, of said light sources, outside of said overlap, where said overlap is present, such that the exposure of the exposed pixels is the same.

In an embodiment of the invention, exposing comprises exposing said pixel to a plurality of said light sources. Alternatively, exposing comprises exposing said pixel to only one of said light sources.

Optionally, the at least one pixel is exposed to one or more of the light sources chosen randomly or quasi-randomly. Alternatively, the one or more light sources is chosen in accordance to a predetermined repeat to reduce visual artifacts.

Optionally, a plurality of pixels in different columns along the rows are exposed in accordance with the method.

In an embodiment of the invention, the image thus formed is a latent image and including developing the latent image to form a visible image. In an embodiment of the invention, developing comprises contacting the surface with a toner. Alternatively, developing comprises chemical development.

BRIEF DESCRIPTION OF FIGURES

Particular exemplary embodiments of the invention will be described with reference to the following description in conjunction with the figures, wherein identical structures, elements or parts which appear in more than one figure are preferably labeled with a same or similar number in all the figures in which they appear, in which.

DETAILED DESCRIPTION OF EMBODIMENTS

The print heads described herein can be used with a wide variety of printing and other image forming methods and in a variety of applications. To simplify the understanding of the construction and operation of the printing heads, two image forming devices within which the print heads can be used are described first (FIGS. 1A and 1B), it being understood that the details of construction of the image forming devices are not meant to limit the scope of the invention.

Figure 1A:
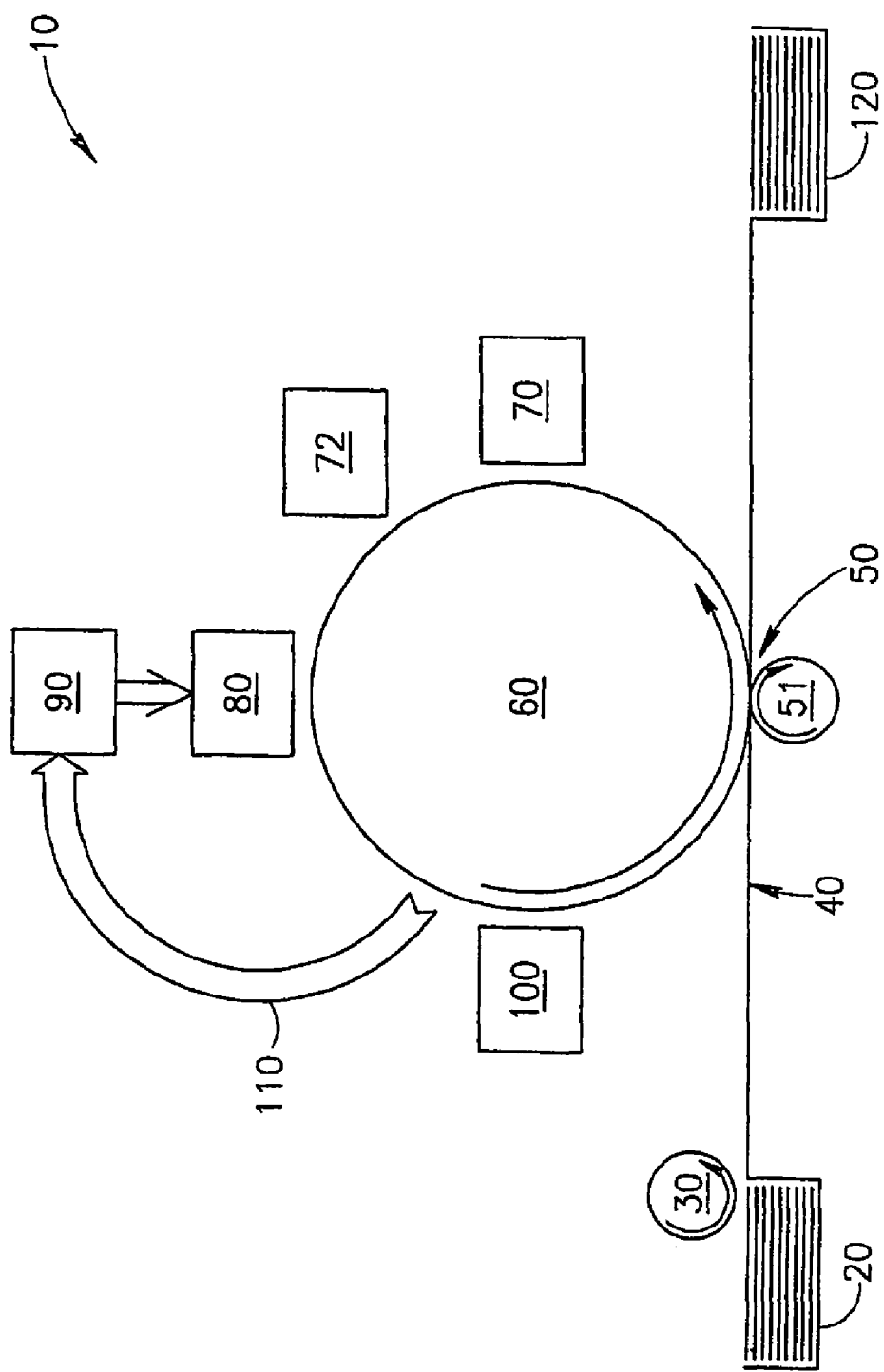
FIG. 1A is a simplified schematic illustration of a printing device according to an exemplary embodiment of the invention.

FIG. 1A is a simplified (side view) schematic illustration of a printing device 10 according to an exemplary embodiment of the invention. Printing device 10 is based on any electrographic printing system known in the art utilizing powder or liquid toner. Such devices are commonly used in printers, copy machines and faxes.

Printing device 10 comprises, in the exemplary embodiment shown, a photoreceptor 60 of any type. For example, photoreceptor 60 may be a belt type or drum type photoreceptor and it may be an organic or selenium photoreceptor. Alternatively, other photoreceptors may be used. The photoreceptor is driven, by a motor (not shown) in the direction indicated in FIG. 1A. Photoreceptor 60 first passes a charger 72, for example a scorotron or other charger as known in the art, which charges photoreceptor 60. The photoreceptor passes an irradiator 80, which irradiates the photoreceptor with light to selectively discharge portions of the photoreceptor and form a latent image on the photoreceptor. Exemplary discharge devices are described below with respect to FIGS. 2A and 2B. Printing device 10 accepts image data to a control circuitry 90 from a standard source such as a computer or scanner. Control circuitry 90 controls irradiator 80 to create the latent image.

The selectively discharged photoreceptor is then brought into operational conjunction with a development system 100, which develops the latent image to form a developed image. The development system may be a liquid toner system, a powder toner system or any other system capable of developing an electrostatic latent image.

Printing device 10 comprises an input bin 20, which supplies a hard copy sheet 40 such as paper or transparency film to be printed on. In the exemplary device shown, hardcopy sheet 40 is passed by a paper feed 30 to a transfer station 50 where it is brought into operational contact with photoreceptive surface 60, on which the developed image is formed. The developed image is transferred to copy sheet 40 by an electric field imposed by a charge on sheet 40 or an appropriate voltage on a backing roller 51 or by any other appropriate method. The transfer may be direct, as indicated in FIG. 1A or may be indirect, for example, via one or more drum or belt intermediate transfer members. Optionally, where required, a separate fuser (not shown) may be used to fuse the image and fix it to the sheet. Once hardcopy sheet 40 receives an image it is output to an output bin 120 to be collected by a user. Optionally the printer does duplex printing and uses a more complex system in order to print an image on the other side of hardcopy sheet 40. Optionally the printing process described above is performed on a continuous hard copy media.

As photoreceptive surface 60 continues to rotate, the area that transferred an image to hard copy sheet 40 passes through a cleaning station 70 which removes toner remaining on the photoreceptor and optionally discharges any of the latent image remaining on the photoreceptor. The cleaned area then arrives back at charger 72.

The printing system has been presented in very general terms, since, except for irradiator 80 and its associated drivers, the printing system can be any electrostatographic printer or copying system (including one utilizing an intermediate transfer member to transfer the developed image from the photoreceptor to the hardcopy sheet). Similarly, the paper handling system can be any paper handling device suitable for use with a printer or copier.

Figure 1B:
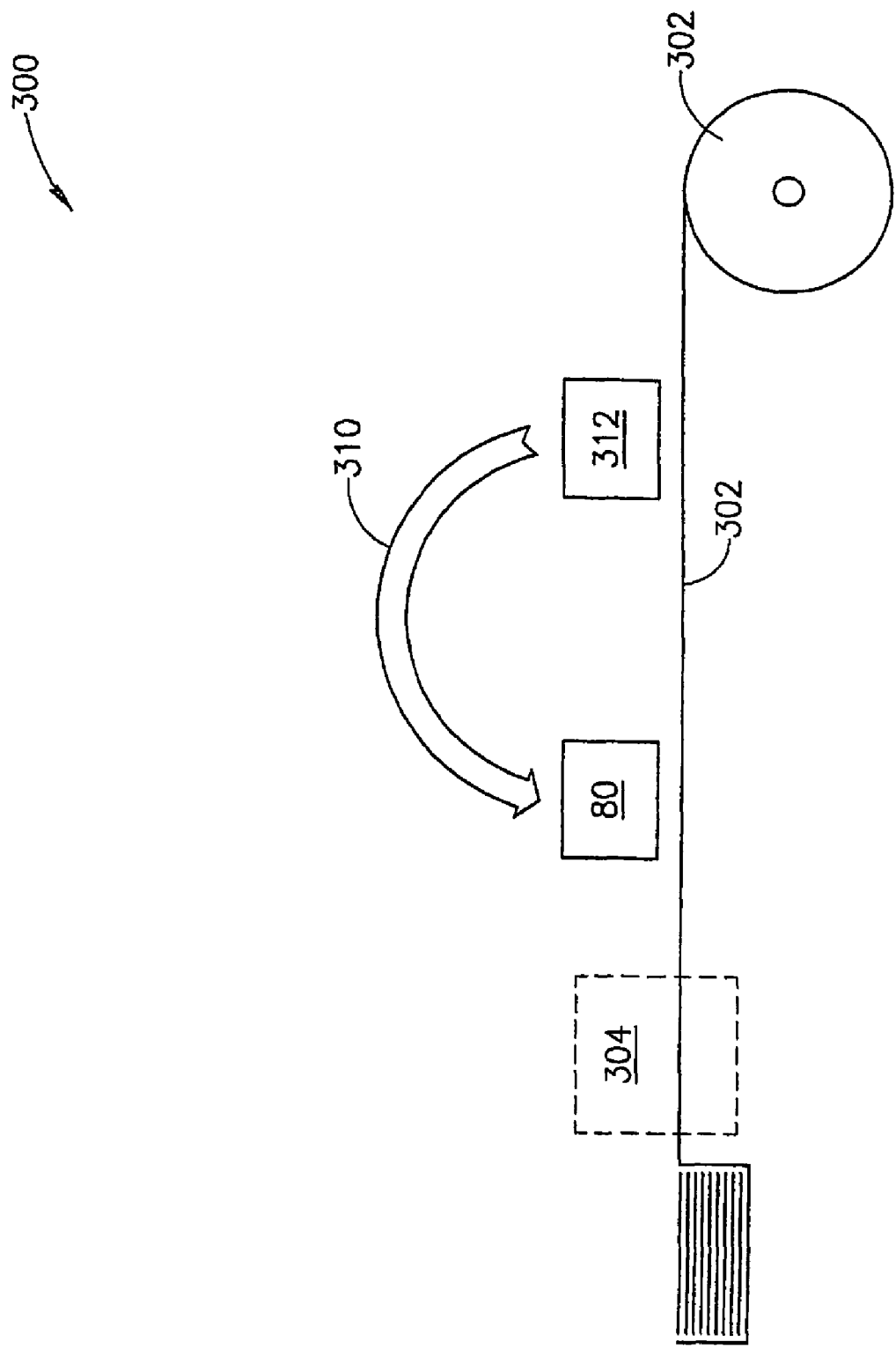
FIG. 1B is a simplified schematic illustration of a digital photo-printing device according to an exemplary embodiment of the invention.

Furthermore, the invention is also usable for direct printing on photopaper, in which a latent image, to be developed by a chemical process, is formed by exposing a photosensitive paper. One such device is schematically illustrated in FIG. 1B. FIG. 1B shows a system 300, comprising a web of photopaper 302 which is fed past irradiator 80 which may be similar in structure to that of irradiator 80 of FIG. 1, and for which exemplary embodiments are described with respect to FIGS. 2A and 2B. Irradiator 80 forms a latent image on the photopaper, which is developed by a developer for such paper schematically shown at 304. Both automatic developers and manual development of photopapers is well known in the art. Automatic developers may deliver the developed pictures in roll form or may cut the web of photopaper into individual images. Automatic developers of this type are found in many photoshops.

Alternatively, 304 represents a manual development station. Alternatively, the photopaper is sheet fed rather than being in web form.

For color photographs, multiple rows of illuminators in each of a plurality of different colors (for example, RGB) are optionally, used to expose the photopaper.

Figure 2A:
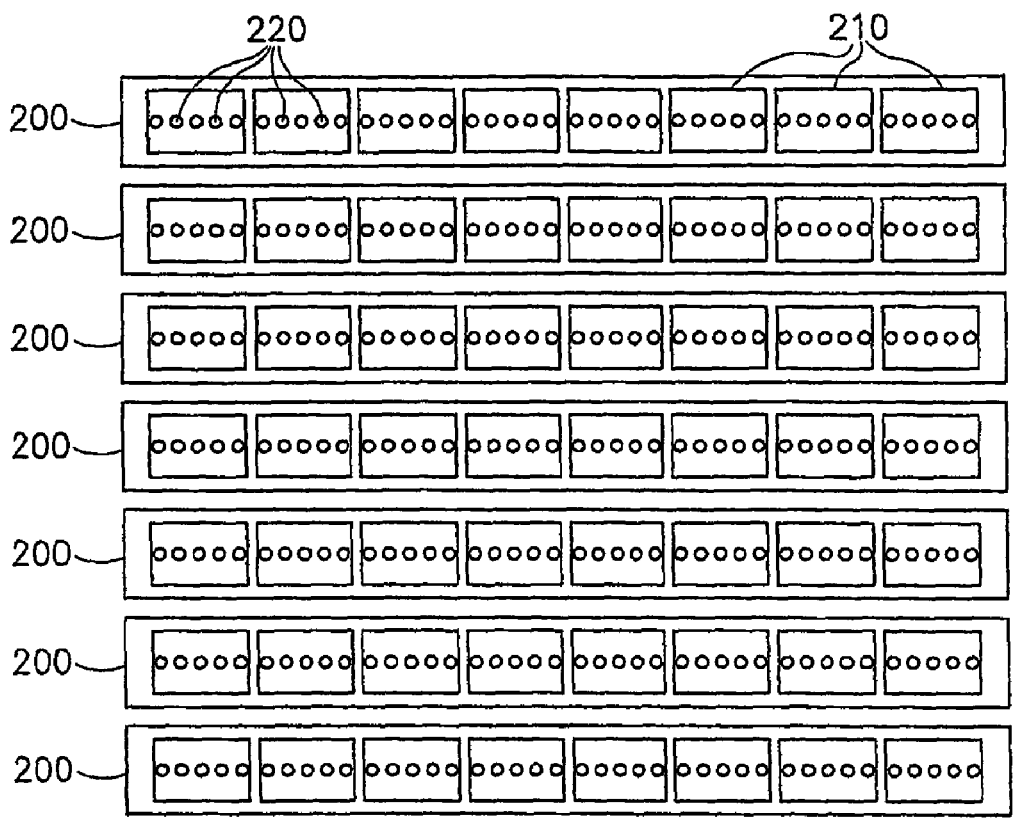
FIGS. 2A and 2B are schematic illustrations of some variations of a LED print head according to exemplary embodiments of the invention.
Figure 2B:
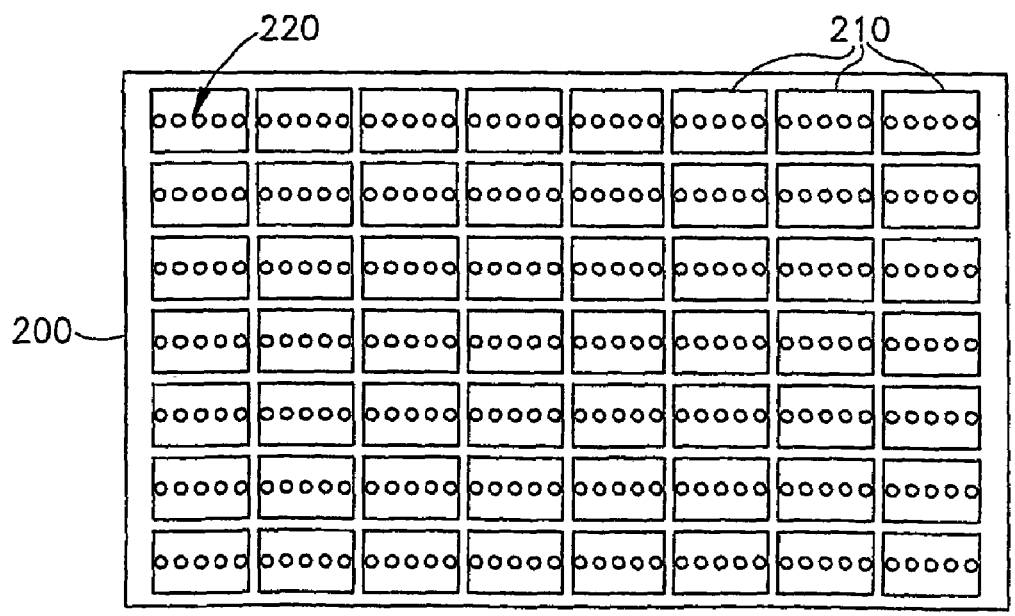

FIGS. 2A and 2B are schematic illustrations of LED print heads corresponding to irradiator 80 of FIG. 1A or FIG. 1B, according to an exemplary embodiments of the invention.

In an embodiment of the invention, irradiator 80 comprises a plurality of separate LED print heads (LPHs 200) as illustrated in FIG. 2A or a single multi-row LPH 200 as illustrated in FIG. 2B. Each LPH 200 as shown in FIG. 2A comprises a row of chips 210 comprising multiple minute LEDs 220 which illuminate photoreceptive surface 60 (or photopaper 302) in order to create an image. Either embodiment of the irradiator may be used with either the printer of FIG. 1A or with the photoprinter of FIG. 1B or with other suitable imaging systems.

LEDs 220 may lack exact uniformity, varying in the spatial position of a specific LED's illumination and/or in the resulting illumination size and/or spot size.

In an exemplary embodiment of the invention, printing device 10 prints sequential rows of pixels of an image with different LPHs 200 in order that any visible anomalies due to the position or size of a specific LED 220 will be reduced in the resultant image produced by printing device 20. Such visible anomalies result, for example, from the generation of low frequency patterns in the image, at least in one dimension, caused by the lack of uniformity of the LEDs or the exposure caused by them.

In some embodiments of the invention, the choosing which line is printed by which of the LPHs is random. This method of choosing, avoids periodic repeating of the variations in printing. Alternatively a predetermined order which is known to minimize the anomalies is used. In either event, the repeat frequency of the anomalies is believed to be increased. This reduces the visibility of the anomaly to a human observer.

Alternatively or additionally, to further break up any visible patterns, the pixels in a row are not all produced using the same LPH. Rather, the particular LED used to expose a pixel is randomly chosen (or chosen in a predetermined order) from all of the pixels in the column of the LPHs that corresponds to the pixel.

In some embodiments of the invention, printing device 10 sequentially prints a row of pixels with more than one LPH 200 (for example 5 or 6 LPHs 200) or LEDs in the column of the LPHs corresponding to the pixel, in order to receive an averaged result, which tends to compensate for any defective or physical variations of a specific LED 220. In this embodiment, the LPHs used or the LEDs along a particular column of the image, may include may be randomly chosen or chosen in some fixed manner.

Optionally the power input to specific LEDs 220 (or to all the LEDs) is reduced, so that the sum of energy from a selected plurality of LEDs is equal to the energy used printing a pixel with a single LED, in order to maintain uniformity of the result. Alternatively or additionally the exposure time of photoreceptive surface 60 to each LED 200 or the overall energy supplied to each LED is reduced in order to compensate for exposure to multiple LEDs.

In some embodiments of the invention, different LPHs 200 or rows in the array of LEDs are loaded in parallel with sequential data in order to increase printing speed by printing different lines or pixels in a column with different LPHs 200, thus eliminating the need to wait for a print head to be loaded with new data. When a single row of LEDs is used, the print rate is limited by the time it takes to transmit data to the individual LEDs in the row. This may be the result of limited bus capacity within the LED structure. It may be a result of limited bus capacity to the LEDs. When multiple rows of LEDs are used, separate busses may be used for each of the rows. Since, each LED exposes fewer than all the pixels in its column, the amount of data transferred is reduced.

In some cases, the exact spacing between LPHs 200 may not be known to a desired accuracy or controllable. Furthermore, the rotation rate of the drum may vary slightly with time, in some manner. Thus, it may not be possible, in the absence of information on the exact angular position of the drum to synchronize the writing of the various LEDs and rows of LEDs so that they write in the coordinated positions, to produce desired patterns of discharged photoreceptor.

As indicated in FIG. 1A at 110 (and FIG. 1B at 310), feedback is optionally provided to control circuitry 90 to synchronize the data written on the charged photoreceptor with a current position of the photoreceptor. Control of data to laser scanners dependent on the exact position of the photosurface and/or its velocity is known. Similar control of the data in the present apparatus is optionally performed. If the current position of the drum is known with respect to a row of LEDs, control circuitry 90 operates to activate selected LEDs in the various rows 200 to write the desired latent image. Feedback 110, may be provided by a angular position sensor (not shown) that measures the rotational position of the drum or by a position sensor 312 shown in FIG. 1B.

In some embodiments of the invention the illuminators are calibrated.

In one calibration mode, actual relative position of the LPHs is determined by printing test patterns using the rows of LEDs. The relative positions of the LPHs (and the LEDs in the various rows) is determined by assuming a particular position for each of the rows (and LEDs) and then printing a pattern which should (based on the assumed position) provide a uniform exposure. This will generally result in an imperfect black image (or white band in a write white system). The position is varied, by a search technique to improve the assumed spacing and positions until an acceptable black (or white) image is determined. Similarly, the output power and spot size of the individual LEDs may be determined (and compensated for, by changes in the driving power of the LEDs).

Alternatively or additionally, patterns of illumination using only one row at a time are used to determine the position of weak or dead LEDs or LEDs having a deviant size or power. Other fixed patterns may be used to map the LEDs. Such mapping may be used to avoid the use of some LEDs or to better match the energy delivered to the pixels when using multiple LEDs to illuminate a pixel. Alternatively or additionally, the mapping may be used to adjust the power or energy into the LEDs so that their light output is more uniform.

Alternatively, a plurality of patterns of illumination are used to determine the print quality with the different patterns of illumination.

Under some circumstances randomization of the LED used for irradiation and/or irradiation by multiple LEDs is also believed to make artifacts in all directions less objectionable.

In some embodiments of the invention, a latent image forming device 80 comprises at least 5 rows of LEDs in order to enhance print quality. Computations by the inventor indicate that, while fewer rows can be used, use of 5 or more rows provides, statistically, for a high level of artifact reduction Fewer rows provide lesser improvement. Alternatively a latent image forming device 80 comprises between 6 to 10 rows of LEDs in order to further enhance print quality. Optionally, latent image forming device 80 comprises more than 10 rows of LEDs in order to allow more flexibility in enhancing a printout In some embodiments of the invention, methods described supra are used together in order to further improve the images provided by printing device 10, for example a printing device in which a row of pixels is printed multiple times by different LPH 200 and each sequential row of pixels is written by an different set of LPH 200.

FIG. 2B illustrates an exemplary embodiment of the invention in which printing device 10 is comprised of a single LPH 200 with multiple rows of LEDs. Optionally the above described embodiments in this description are implemented using a single LPH 200 with multiple rows of LEDs in contrast to LPH 200 shown in FIG. 2A comprising multiple LPH 200 with a single row of LEDs. As indicated above, the LPH of FIG. 2B operates in a manner similar to that of the LPHs of FIG. 2B.

In the system of FIG. 2B, the starting point for the calibration described with respect to FIG. 2A is more exactly known, since the spacing between the rows is generally known more accurately, especially if multiple rows are formed on a common semiconductor substrate. In some cases, position calibration need not be performed. Optionally, after calibration, a fixed set of LEDs are chosen for each column such that the resulting image is as uniform as possible. This fixed set of LEDs is then used to irradiate the photosensitive surface.

In some embodiments of the invention, printing device 10 comprises multiple LPHs 200 of which at least one comprises multiple rows of LEDs.

In some embodiments of the invention a row of light sources is formed of a plurality of sub-rows, as described in the above referenced U.S. Pat. Nos. 5,630,027 and 5,061,049. While these references (and other references described above) there is a choosing between LEDs in forming those pixels in the overlap between the partial rows, the present invention includes the choosing of light sources outside any rows that are formed by overlapping partial rows.

The methods of the invention may result in one or more of the following benefits:
1. Overcome printout anomalies such as banding.
2. Increase print quality by providing a more uniform image.
3. Overcome defective LED for example by printing pixels in a column containing a defective LED with LEDs other than the defective ones.
4. Increase data loading speed, for example, by loading sequential data to different sets of LEDs in parallel.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. An apparatus for exposing, in a binary manner, a photoreceptive surface having a width and having relative movement with an irradiator in a direction perpendicular to the width, comprising:
    an irradiator comprising substantially identical light sources organized in a plurality of rows and a plurality of columns, each said row of light sources having an axis generally directed along said width, said rows being spaced in a direction generally perpendicular to said width and along the columns to form a generally rectangular array of light sources, where the light sources are organized in groups of light sources that are each one light source in height and a plurality of light sources in width, a single light source group being positioned in each row; and
    a controller that controls activation of the light sources to selectively irradiate portions of said photoreceptive surface to form a latent image thereon during said relative motion, using fewer than all of the light sources available for illuminating each pixel to be printed;
    wherein the controller controls the light sources such that each of said pixels to be printed that is irradiated is exposed to a same amount of light,
    wherein to minimize visibility of anomalies within the light sources, the controller is to:
    randomly select, for a line of pixels to be printed, the groups of light sources to print the line of pixels; and,
    one of:
        select, for sequential rows of pixels to be printed, different groups of light sources to print the sequential rows of pixels; or,
        randomly select, for each pixel within a row of pixels to be printed, the light source to print the pixel from all the light sources within the light source groups of a column corresponding to the pixel,
    wherein the light sources are anomalous in that the light sources lack uniformity.

2. The apparatus according to claim 1, wherein when rows of pixels to be printed are each illuminated by two rows of light sources, one row of light sources illuminating pixels on one end of a row of pixels and a second row of light sources illuminating pixels on the other end of the row of pixels, with both rows illuminating pixels in an overlap region of the row of pixels to be printed, wherein light sources outside the overlap region are controlled by said controller such that each of said pixels to be printed that is irradiated is exposed to a same amount of light.

3. The apparatus according to claim 1, wherein the light sources comprise light emitting diodes.

4. The apparatus according to claim 1, wherein each row of said plurality of rows of light sources are on a different print head.

5. The apparatus according to claim 1, wherein more than one of said plurality of rows of light sources are on a single print head.

6. The apparatus according to claim 1, wherein all of said plurality of rows of light sources are on a single print head.

7. The apparatus according to claim 5, wherein at least two of said plurality of rows are formed on a monolithic substrate.

8. The apparatus according to claim 1, wherein said plurality of rows comprises fewer than four rows.

9. The apparatus according to claim 1, wherein said plurality of rows comprises between five and nine rows.

10. The apparatus according to claim 1, wherein said plurality of rows comprises ten or more rows.

11. The apparatus according to claim 1, wherein the light sources from which the exposing light sources are chosen, comprise a set of light sources, chosen to minimize artifacts.

12. The apparatus according to claim 1, wherein said controller is operative to expose pixels along a column of pixels utilizing a plurality of light sources situated in said column.

13. The apparatus according to claim 1, wherein the apparatus includes a motor that provides motion of said photoreceptor.

14. The apparatus according to claim 1, wherein the apparatus includes a position sensor that provides an indication of position of said photoreceptor with respect to said rows of light sources.

15. The apparatus according to claim 14, wherein said controller activates said light sources, responsive to said indication of position.

16. The apparatus according to claim 1, wherein the photoreceptive surface is a charged photoconductive surface and wherein exposure to light of the light sources selectively discharges the surface.

17. The apparatus according to claim 16, further comprising:
a developer that develops the latent image with a colored toner to form a developed image thereon; and
a transfer station at which said developed image is transferred to a final substrate.

18. The apparatus according to claim 17, wherein the colored toner is a powdered toner.

19. The apparatus according to claim 17, wherein the colored toner is a liquid toner.

20. The apparatus according to claim 1, wherein exposure from said light sources forms a latent image in said photoreceptive surface that can be chemically developed to form a visible image.

21. The apparatus according to claim 20, further comprising:
a latent image forming device; and
a developer that chemically develops the latent image to form a visible image.

22. The apparatus according to claim 20, further comprising:
a plurality of latent image forming devices;
each said device emitting light of a different color; and
a developer that chemically develops the latent image to form a visible image.

23. The apparatus according to claim 22, wherein the colors include red, green and blue.

24. A method of pixelized image formation on a photosensitive surface, comprising:
providing relative motion of the photosensitive surface relative to a multiplicity of light sources, such that pixels to be printed on the surface pass a plurality of said light sources, the light sources organized in a plurality of rows and a plurality of columns, the light sources further organized in groups of light sources that are each one light source in height and a plurality of light sources in width, a single light source group being positioned in each row; and
exposing the pixels to be printed of the surface to more than one, but fewer than the plurality, of said light sources, as selected by a controller, characterized in that the exposure of the exposed pixels to be printed is the same;
wherein to minimize visibility of anomalies within the light sources, the controller is to:
randomly select, for a line of pixels to be printed, the groups of light sources to print the line of pixels; and,
one of:
select, for sequential rows of pixels to be printed, different groups of light sources to print the sequential rows of pixels; or,
randomly select, for each pixel within a row of pixels to be printed, the light source to print the pixel from all the light sources within the light source groups of a column corresponding to the pixel,
wherein the light sources are anomalous in that the light sources lack uniformity.

25. The method according to claim 24, wherein when rows of pixels to be printed are each illuminated by two rows of light sources, one row of light sources illuminating pixels on one end of a row of pixels and a second row of light sources illuminating pixels on the other end of the row of pixels, with both rows illuminating pixels in an overlap region of the row of pixels to be printed, wherein light sources outside the overlap region are exposed to a same amount of light.

26. The method according to claim 24, wherein a plurality of pixels are exposed in accordance with The method.

27. The method according to claim 24, wherein the image thus formed is a latent image and including developing the latent image to form a visible image.

28. The method according to claim 27, wherein said developing comprises contacting the surface with a toner.

29. The method according to claim 27, wherein developing comprises chemical development.

* * * * *